Sept. 11, 1923.
T. J. LITLE, JR
CLUTCH DISK
Filed July 13, 1921
1,467,732
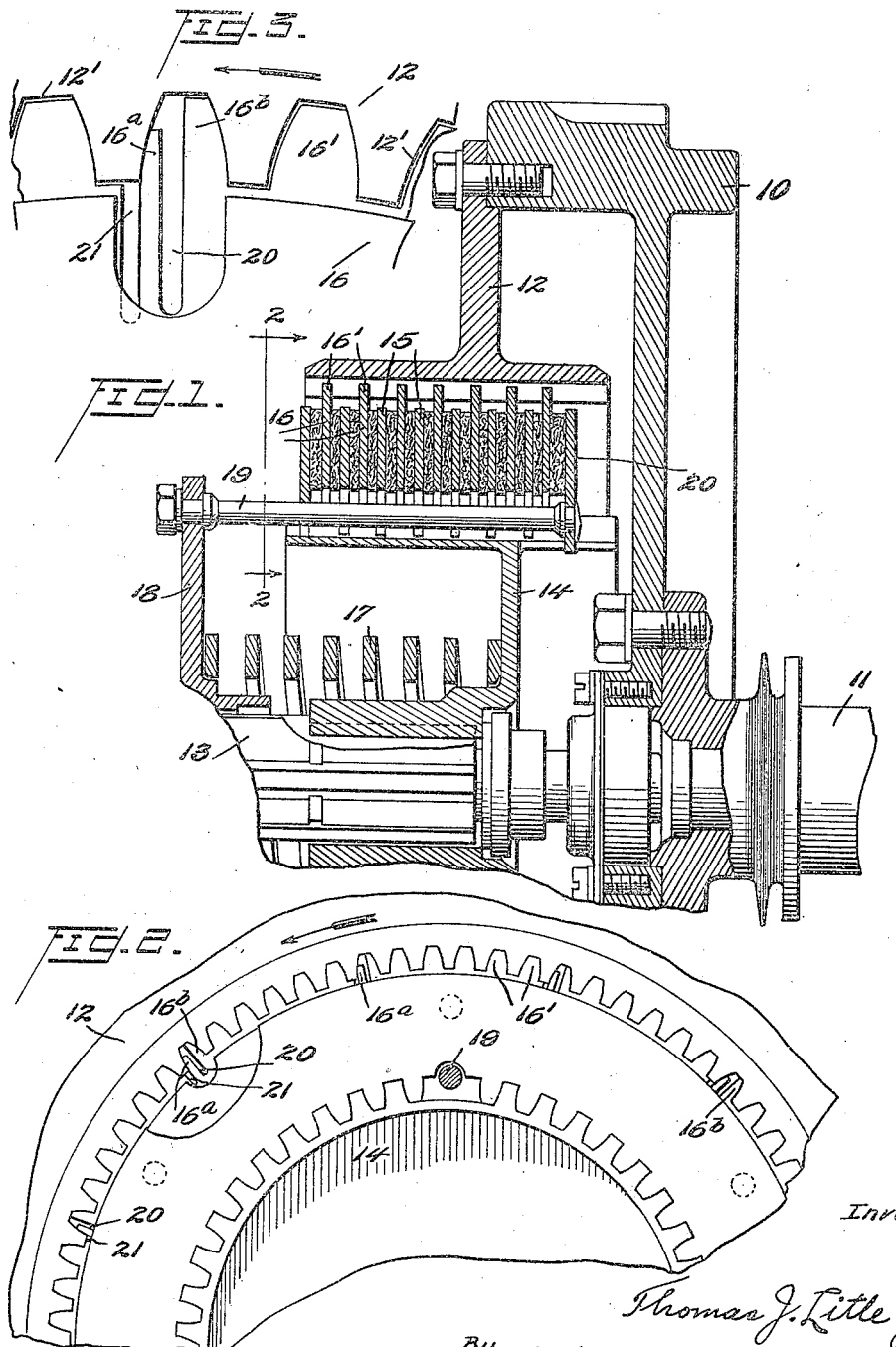

Patented Sept. 11, 1923.

1,467,732

UNITED STATES PATENT OFFICE.

THOMAS J. LITLE, JR., OF DETROIT, MICHIGAN, ASSIGNOR, BY MESNE ASSIGNMENTS, TO HAROLD H. EMMONS, OF DETROIT, MICHIGAN.

CLUTCH DISK.

Application filed July 13, 1921. Serial No. 484,417.

*To all whom it may concern:*

Be it known that I, THOMAS J. LITLE, Jr., a citizen of the United States, and residing at Detroit, Wayne County, State of Michigan, have invented certain new and useful Improvements in Clutch Disks, of which the following is a specification.

The present invention relates to gearing and particularly to gears having means for preventing back-lash between the teeth thereof and the teeth of intermeshing gears. An especially advantageous application of the invention is in connection with multiple disk clutches, particularly automobile clutches, where its use prevents the objectionable and well known rattling of the clutch when the automobile is travelling at low speeds or over rough roads.

Briefly stated the invention consists in radially slotting one or more of the teeth of the clutch ring or other toothed wheel to provide a narrow resilient tongue on one side of the slot and in spreading apart the two portions of the tooth so that it occupies practically without the usual clearance, an entire interdental space of the intermeshing wheel. No driving force is exerted on the resilient tongue but this only acts when the driven gear tends to rotate faster than the driving gear to prevent vibration and rattling between the gears or toothed wheels.

In the accompanying drawings:

Figure 1 is a longitudinal section through a portion of a motor vehicle multiple disk clutch having the invention incorporated therewith;

Figure 2 is a section on line 2—2 of Figure 1; and

Figure 3 is a side view of the back-lash preventing means drawn to a larger scale.

The fly wheel of a motor vehicle is indicated at 10 in the drawings, this fly wheel being mounted upon a driving shaft 11 in the usual manner and supporting a driving ring 12. A driven shaft 13 has splined or keyed thereon a driven ring 14 and the driving and driven rings 12 and 14 respectively are adapted to be operatively connected by means of a multiple disk clutch. This clutch comprises essentially a plurality of annular rings 15 rotatable with the driven ring and a plurality of rings 16 interleaved between rings 15 and carried by the driving ring 12. Rings 16 are provided with facings of asbestos fiber or other well known equivalent material to effect the frictional engagement between the plates 15 and plates 16. A spring 17 normally pressing slidable disk 18 toward the left (Figure 1) maintains the clutch plates in mutual engagement, the disk 18 being connected by rods 19 to a plate 20, which is adapted to engage the end disk, and to press all of the disks firmly together. The driving ring 12 has a plurality of grooves on its inner surface, these grooves being parallel to each other and to the axis of the ring and adapted to receive the teeth 16' of the clutch rings 16 so that these clutch rings may be moved longitudinally of the driving ring but are non-rotatable relatively thereto about the axis of the shaft 13.

The structure so far described is well known in the art and is a satisfactory and efficient clutch construction. It has usually been found necessary, however, in such constructions to have a minimum clearance of .010 or .012 of an inch between the teeth 16' of disk 16 and the grooves 12' of driving ring 12 in order that the plates be freely slidable longitudinally, in clutching and unclutching the shafts. Where the machine is being driven at very low speeds or over rough roads the teeth 16' have a tendency to vibrate back and forth between the walls of the grooves 12' and to cause a considerable vibration and rattling noise, which is objectionable. To overcome this difficulty a number of teeth on each disk 16 are slotted radially at 20, as shown clearly in Figures 2 and 3, this slot being to one side of the center of the tooth, and a second slot 21 is made, also substantially radially, leaving a tongue $16^a$ which is relatively long and narrow and which is resilient to a considerable degree. The major portion $16^b$ of the tooth is solid and relatively non-resilient. The portions $16^a$ and $16^b$ are then spread apart so that their bearing surfaces are separated to such an extent that when applied to the driving ring 12 a clearance of only about .002 of an inch is left between the bearing surfaces of the tooth and the walls of the grooves in the driving ring. The rigid portion $16^b$ of the tooth receives the driving thrust while the resilient portion $16^a$ only acts in case of back-lash. Where there is a tendency for the driven ring 14 to rotate faster than the driving ring 12 the spring tongues $16^a$ become active to prevent rattling noises.

The many applications and advantages of the invention will be apparent to those skilled in the art, and, it will also be apparent that the invention may have different embodiments and is not limited to the exact form shown and described.

Having thus described the invention what is claimed as new and desired to be secured by Letters Patent is:

1. A toothed wheel having a tooth slotted to one side of its center to provide a resilient tongue on one side of said slot and a rigid tongue on the other side of said slot.

2. A toothed wheel having a tooth slotted to provide a resilient tongue on one side of said slot, the slot extending below the base of the tooth.

3. A toothed wheel having a tooth slotted to provide a resilient tongue on one side of said slot, the slot extending below the base of the tooth and said wheel being slotted adjacent said resilient tongue for the purpose set forth.

4. A toothed wheel having substantially parallel slots formed therein, one of said slots being formed in a tooth and the other adjacent said tooth and both slots extending below the base of the tooth, for the purpose set forth.

5. In a toothed clutch ring, a tooth slotted in a substantially radial direction, the portion of the tooth lying on one side of the slot being resilient, and the slotted tooth being adapted to occupy an entire interdental space of the intermeshing clutch member.

6. In a toothed clutch ring, a tooth slotted in a substantially radial direction to one side of its center to provide a resilient tongue on one side of the slot and a rigid portion on the other side, the resilient tongue being bent laterally so that the tooth is adapted to occupy an entire interdental space of the intermeshing clutch member.

In testimony whereof I hereunto affix my signature.

THOMAS J. LITLE, Jr.